(12) United States Patent
Krajewski

(10) Patent No.: US 10,286,778 B1
(45) Date of Patent: May 14, 2019

(54) WHEEL ASSEMBLIES AND OUTDOOR POWER EQUIPMENT HAVING SAME

(71) Applicant: Briggs & Stratton Corporation, Wauwatosa, WI (US)

(72) Inventor: Christopher M. Krajewski, West Allis, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 14 days.

(21) Appl. No.: 15/834,181

(22) Filed: Dec. 7, 2017

Related U.S. Application Data

(60) Provisional application No. 62/431,383, filed on Dec. 7, 2016.

(51) Int. Cl.
| | | |
|---|---|---|
| *B60K 17/00* | (2006.01) | |
| *B60K 17/04* | (2006.01) | |
| *A01D 101/00* | (2006.01) | |
| *A01D 69/00* | (2006.01) | |
| *A01D 69/03* | (2006.01) | |
| *A01D 34/66* | (2006.01) | |

(52) U.S. Cl.
CPC .......... *B60K 17/043* (2013.01); *A01D 34/66* (2013.01); *A01D 69/00* (2013.01); *A01D 69/03* (2013.01); *A01D 2101/00* (2013.01); *B60Y 2200/223* (2013.01)

(58) Field of Classification Search
CPC .......... B62D 49/0621; B62D 49/0635; B60K 17/043
See application file for complete search history.

(56) References Cited

U.S. PATENT DOCUMENTS

| | | | | |
|---|---|---|---|---|
| 3,349,861 A | * | 10/1967 | Oral ................... | B62D 49/0635 180/15 |
| 3,495,672 A | * | 2/1970 | Barr ...................... | B60F 3/0007 180/15 |
| 3,584,699 A | * | 6/1971 | Urick ................... | B60K 17/342 180/15 |
| 3,721,077 A | * | 3/1973 | Van Der Lely ........ | A01B 51/00 180/327 |
| 3,924,704 A | * | 12/1975 | Lindblom ........ | B60G 17/01925 180/41 |
| 4,176,726 A | * | 12/1979 | Schaeff ..................... | B60F 3/00 180/15 |
| 4,210,219 A | * | 7/1980 | Oswald .................. | B60B 37/00 180/24.12 |
| 4,664,208 A | * | 5/1987 | Horiuchi ............ | B62D 49/0671 180/15 |

* cited by examiner

*Primary Examiner* — Bryan A Evans
(74) *Attorney, Agent, or Firm* — Fox Rothschild LLP

(57) ABSTRACT

Outdoor equipment, such as a lawn mower, includes a frame, a riding area, front wheels, and a wheel assembly. One wheel assembly includes an outer plate, a rotating bracket pivotally connected to the outer plate, a primary wheel supported by the rotating bracket, and a secondary wheel supported by the rotating bracket. The rotating bracket is rotatable about a pivot axis, the primary wheel is axially offset from the pivot axis, and the secondary wheel is axially offset from the primary wheel and from the pivot axis. In use, the rotating bracket consistently provides two points of contact (one by the primary wheel and another through the secondary wheel) by rotating automatically about the pivot axis due to gravity and forces transferred through the wheels. This enhanced distribution of forces may provide a more comfortable, cushioned riding experience.

19 Claims, 12 Drawing Sheets

US 10,286,778 B1

WHEEL ASSEMBLIES AND OUTDOOR POWER EQUIPMENT HAVING SAME

RELATED APPLICATION AND CLAIM OF PRIORITY

This patent document claims priority to U.S. Provisional Patent Application No. 62/431,383, filed Dec. 7, 2016. The disclosure of the priority application is fully incorporated by reference.

BACKGROUND

FIG. 1 illustrates a prior art lawn mower 10 having a frame 12, front wheels 14, rear wheels 16, and a riding area 17 such as a seat or a standing platform. A mower deck 18 extends outwardly in front of at least one of the rear wheels 16, and re-locating the mower deck 18 may involve substantial engineering and tooling changes. Moreover, the mower 10 has an overall length 19 that is known for, and which sometimes may be selected for, packaging and shipping considerations.

Embodiments of the current invention relate to wheel assemblies and to outdoor equipment (such as, for example, lawn mowers, leaf vacuums, and snow blowers), having such wheel assemblies.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to one embodiment, a lawn mower includes a frame, a mower deck, front wheels, an outer plate fixed relative to the frame, a spacer between the outer plate and the frame, a rotating bracket pivotally connected to the outer plate, a primary wheel supported by the rotating bracket, and a secondary wheel supported by the rotating bracket. The rotating bracket is rotatable about a pivot axis, and the secondary wheel is axially offset from the primary wheel.

According to another embodiment, outdoor equipment includes a frame, front wheels, a rotating bracket, a primary wheel supported by the rotating bracket, and a secondary wheel supported by the rotating bracket. The rotating bracket is rotatable relative to the frame about a pivot axis, the primary wheel is axially offset from the pivot axis, and the secondary wheel is axially offset from the primary wheel and from the pivot axis.

According to still another embodiment, a wheel assembly includes an outer plate, a rotating bracket pivotally connected to the outer plate, a primary wheel supported by the rotating bracket, and a secondary wheel supported by the rotating bracket. The rotating bracket is rotatable about a pivot axis, the primary wheel is axially offset from the pivot axis, and the secondary wheel is axially offset from the primary wheel and from the pivot axis.

DETAILED DESCRIPTION

Figure 1:
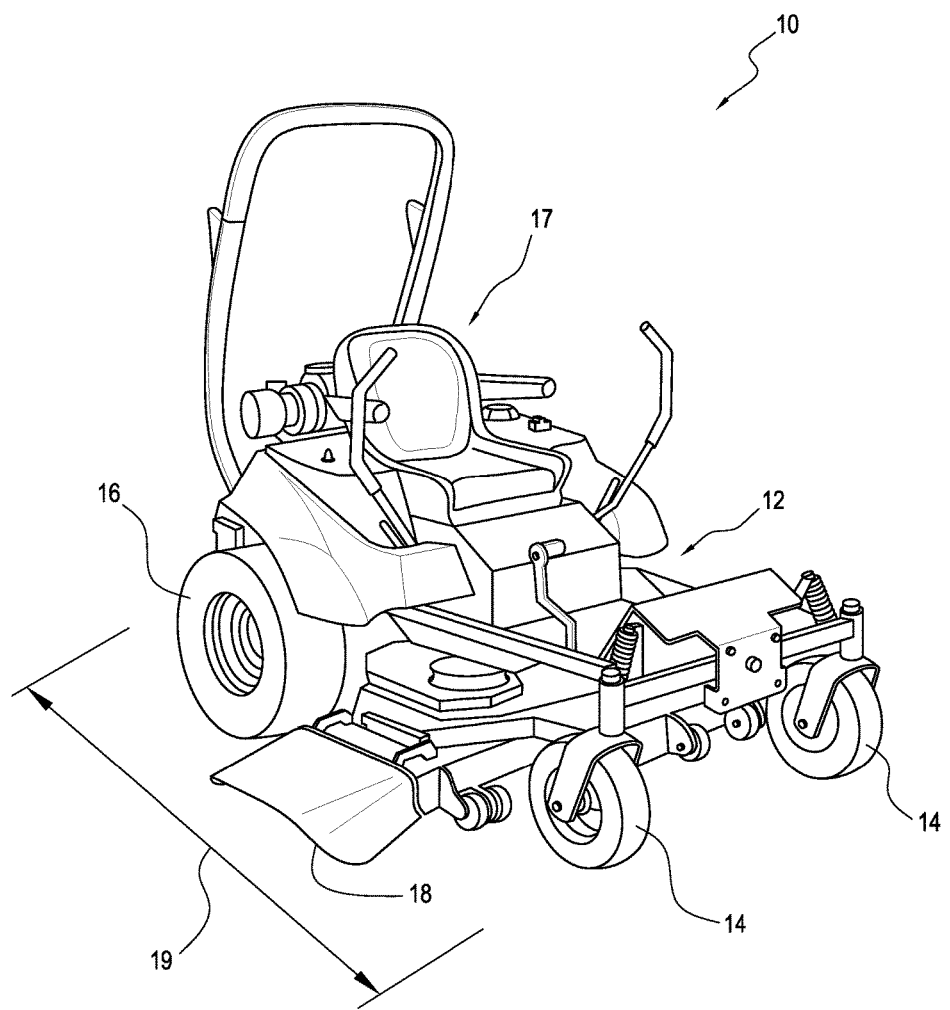
FIG. 1 is a perspective view of a PRIOR ART lawn mower.
Figure 2:
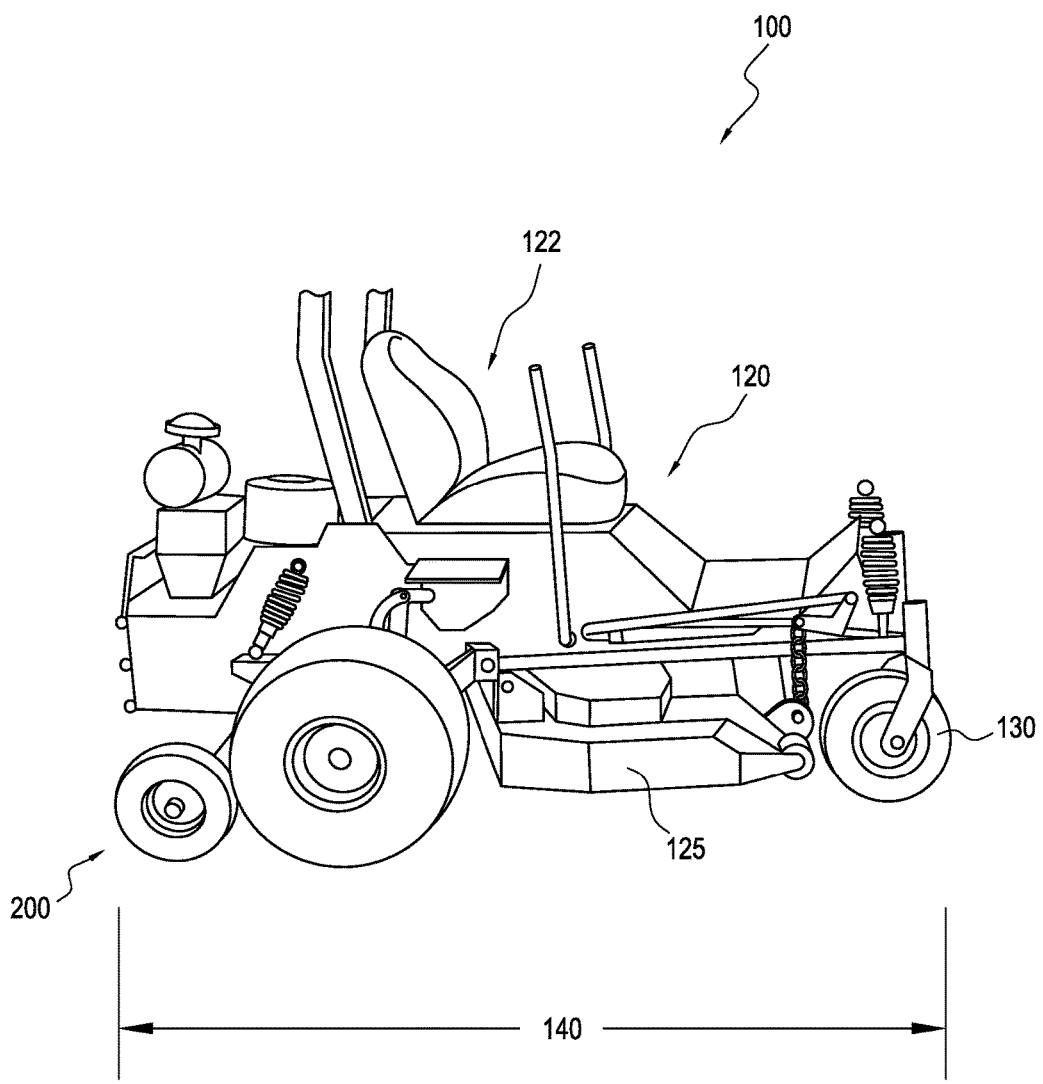
FIG. 2 is a side view of a lawn mower, according to an embodiment of the current invention.

FIGS. 2-6 illustrate outdoor equipment 100, such as a lawn mower, according to an embodiment of the current invention. As with the prior art mower 10, the lawn mower 100 has a frame 120, a riding area 122 such as a seat or a standing platform, a mower deck 125, front wheels 130, and an overall length 140 (FIG. 2). Moreover, those skilled in the art will appreciate that the equipment 100 may include a propulsion source (e.g., an internal combustion engine or a battery), steering, and other subsystems and components known in the prior art. But instead of the traditional rear wheels 16, the equipment 100 includes wheel assemblies 200. Though a ridden lawn mower 100 is provided for illustration, it is specifically envisioned for the wheel assemblies 200 to be used on other ridden and walk-behind outdoor equipment as well—including, for example, walk-behind lawn mowers, leaf vacuums, and snow blowers.

Figure 3:
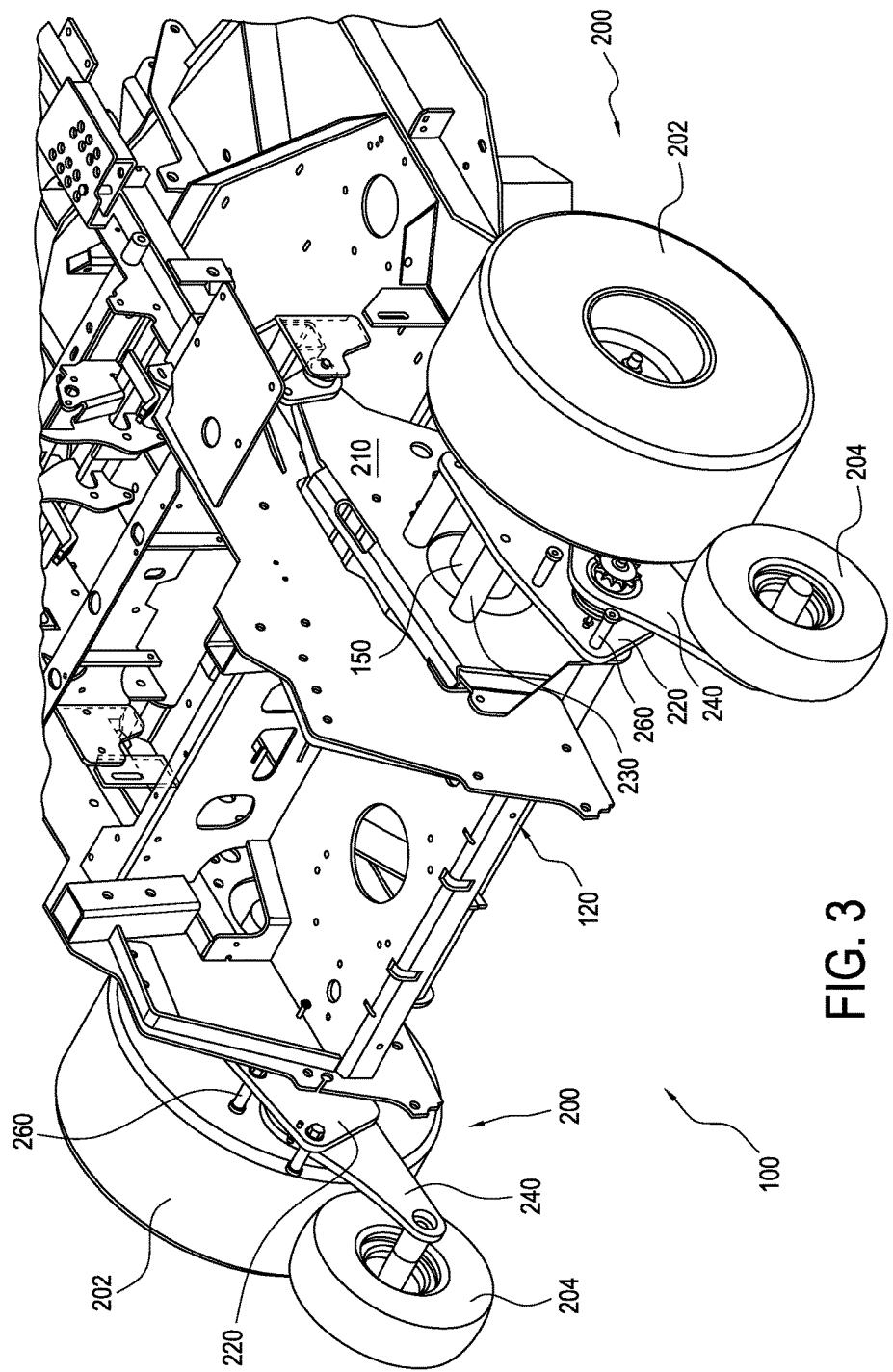
FIG. 3 is a perspective view of a wheel assembly from the lawn mower of FIG. 2, along with part of the lawn mower frame.

Each wheel assembly 200 includes a primary wheel 202, a secondary wheel 204, and mounting and actuation components. It may be desirable, as shown in FIGS. 2 and 3, for the primary wheel 202 to be forward of the secondary wheel 204, and to be substantially larger than the secondary wheel 204. Yet in other embodiments, the wheels 202, 204 may be the same size, or the secondary wheel 204 may be larger than the primary wheel 202.

Figure 4:
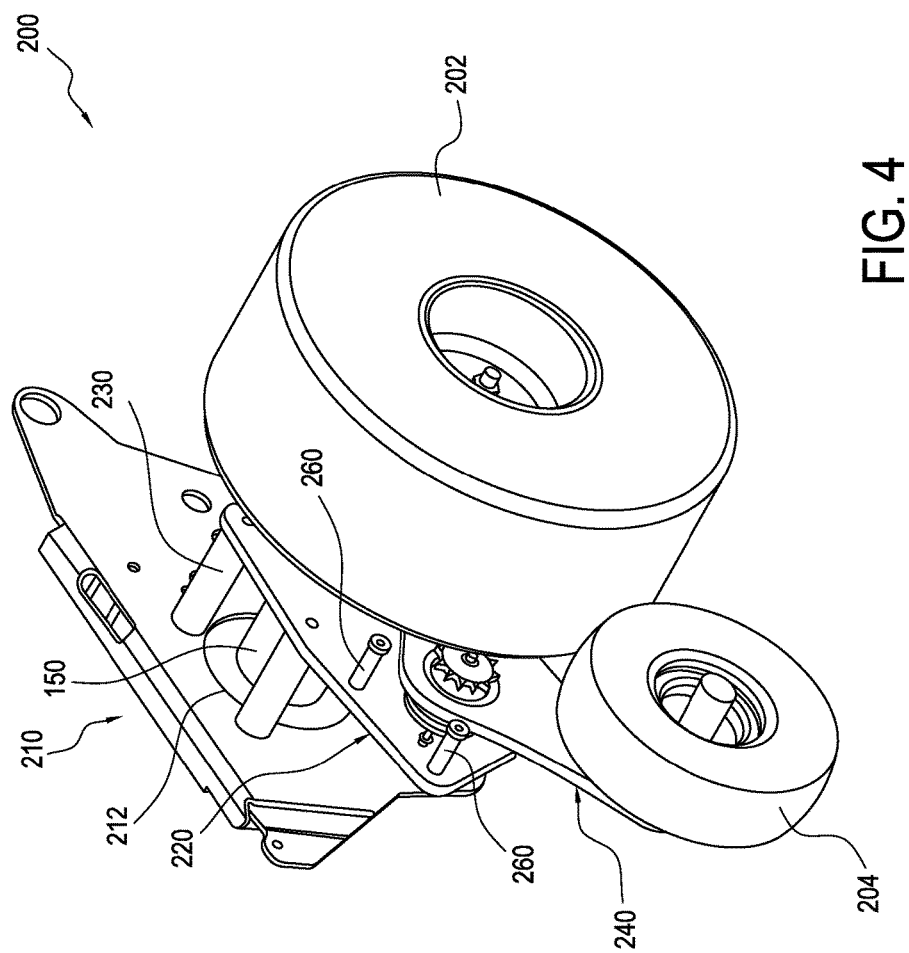
FIG. 4 is a perspective view of a wheel assembly from the lawn mower of FIG. 2.
Figure 5:
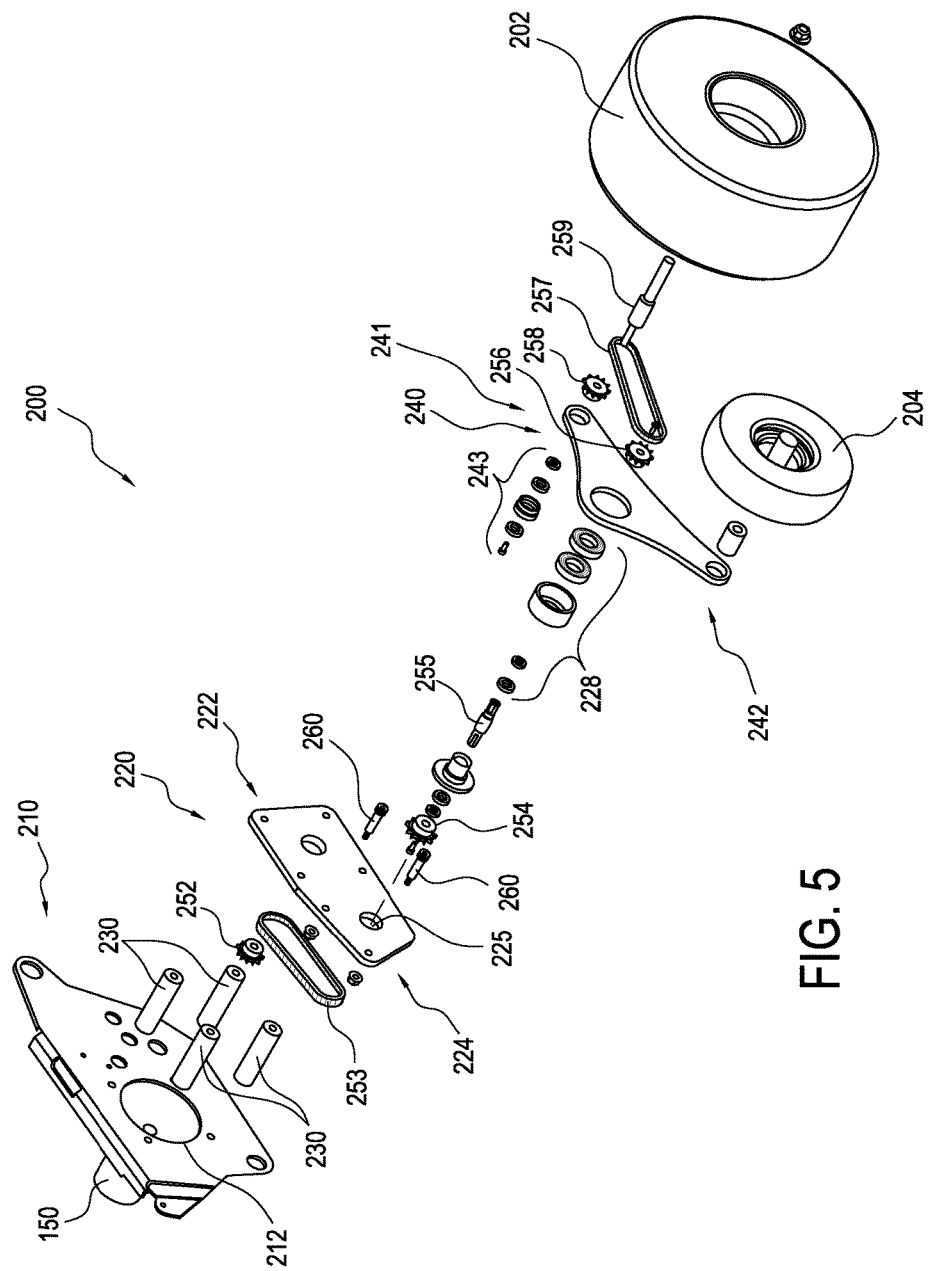
FIG. 5 is an exploded view of the wheel assembly of FIG. 4.
Figure 6:
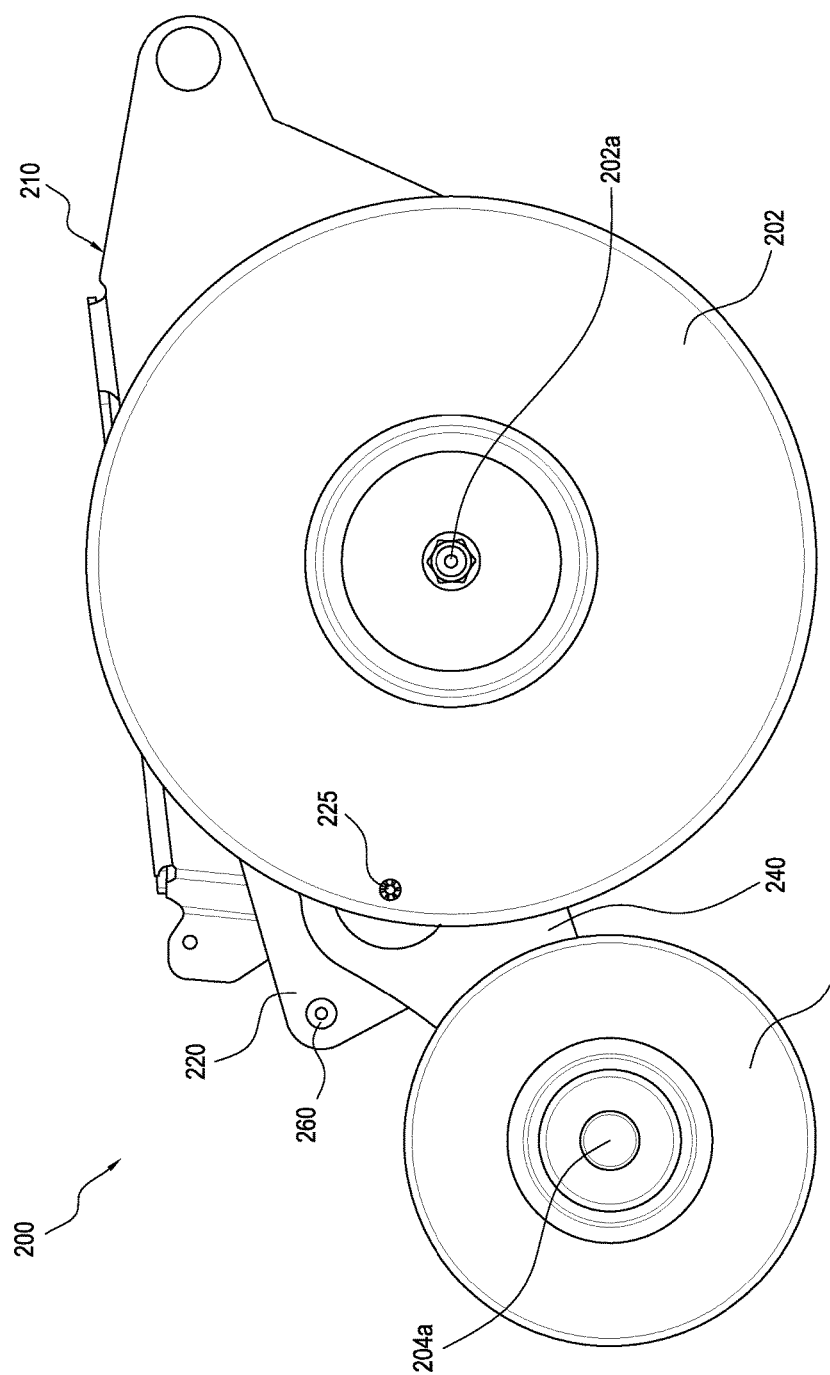
FIG. 6 is a side view of the wheel assembly of FIG. 4.

The mounting components in the embodiment 100 include a pair of plates 210, 220 spaced apart from one another by at least one spacer 230, as shown in FIGS. 3-5. The inner plate 210 is provided to be coupled to the frame 120, such as through bolts, welding, or any other appropriate fastening device or method, and the outer plate 220 is extended outwardly from the inner plate 210 by the spacers 230. In the embodiment 100, a drive shaft 150 is provided to power each wheel assembly 200, and the inner plate 210 includes a hole 212 through which the drive shaft 150 may pass. Four spacers 230 are shown distributed about the hole 212, though more or fewer spacers 230 may be used. The outer plate 220 has a leading end 222 which is generally positioned around the hole 212, and a trailing end 224. When the outer plate 220 is coupled to the inner plate 210 through the spacers 230, the outer plate 220 is generally fixed relative to the inner plate 210 and defines a pivot axis 225 in the trailing end 224, rearward of the hole 212. A rotating bracket 240 is pivotally connected to the outer plate 220, such as through bearings 228 (FIG. 5), to rotate about the pivot axis 225, and the wheels 202, 204 are supported by the rotating bracket 240. In some embodiments, it may be particularly desirable for the wheels 202, 204 to each have an axis of rotation 202a, 204a that is generally equidistant from the pivot axis 225, and for the axes 202a, 204a, 225 to be generally parallel to one another.

In the lawn mower 100, the primary wheel 202 is a driven wheel and the secondary wheel 204 is not powered. Yet other embodiments may power both wheels 202, 204, or only the secondary wheel 204. To transmit power to the primary wheel 202 in the lawn mower 100, a sprocket or pulley 252 is powered by the drive shaft 150 and in turn rotates a chain or belt 253. The chain or belt 253 transmits power from the sprocket or pulley 252 to sprocket or pulley 254, and shaft 255 couples the sprocket or pulley 254 to a sprocket or pulley 256. The sprocket or pulley 256 rotates a chain or belt 257, and the chain or belt 257 powers a sprocket or pulley 258 which turns the primary wheel 202 via a shaft 259. The shaft 259 is located at a forward end 241 of the rotating bracket 240, forward of the drive shaft 150. The sprocket or pulley 258, and thus the shaft 259, may be coupled to the rotating bracket 240 by bearing 243.

The secondary wheel 204 is coupled to the rotating bracket 240 by bearing 244 at a rear end 242 of the rotating bracket 240, such that the axis of rotation for the secondary wheel 204 is rearward of the drive shaft 150. But it may be particularly desirable for the secondary wheel 204 to not extend beyond the rear-most end of the lawn mower 100, so that the overall length 140 is the same with or without the wheel assembly 200. To power the secondary wheel 204 instead of the primary wheel 202, the sprocket or pulley 258 and the shaft 259 could be associated with the secondary wheel 204 instead of the primary wheel 202. Or to power both wheels 202, 204, an additional sprocket or pulley could be fixed to the shaft 255, another shaft with a sprocket or pulley could extend from the secondary wheel 204, and a chain or belt could transmit power between these additional sprockets or pulleys.

Stops 260 extend from the outer plate 220, as shown in FIGS. 3 and 4, to prevent the rotating bracket 240 from pivoting beyond a predetermined range. More particularly, the rotating bracket 240 is allowed to turn about the pivot axis 225 until the rotating bracket 240 hits a respective stop 260 and is prevented from turning further.

Figure 7A:
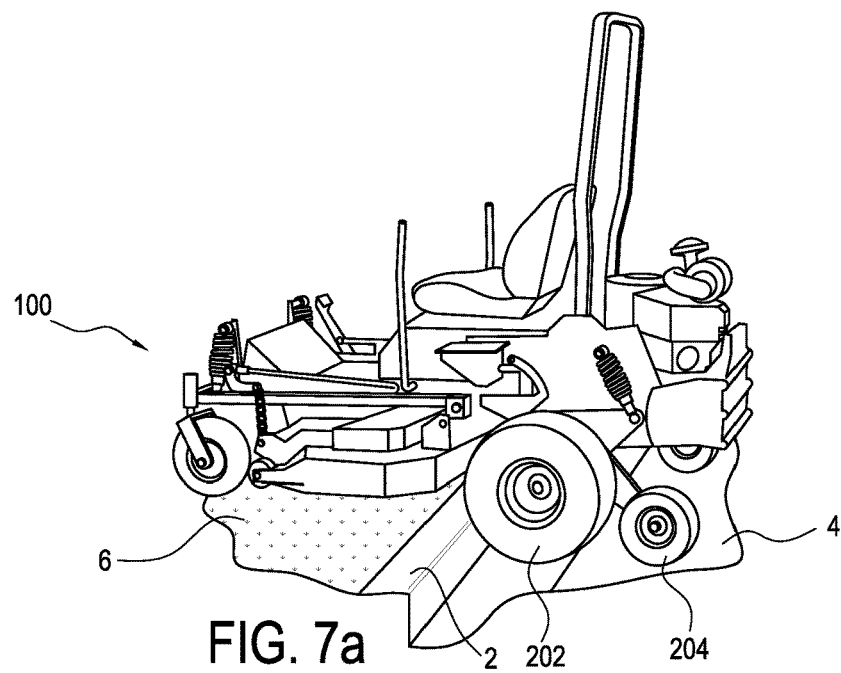
FIGS. 7a-7e illustrate the lawn mower of FIG. 2, while travelling over a curb.
Figures 7B, 7C:
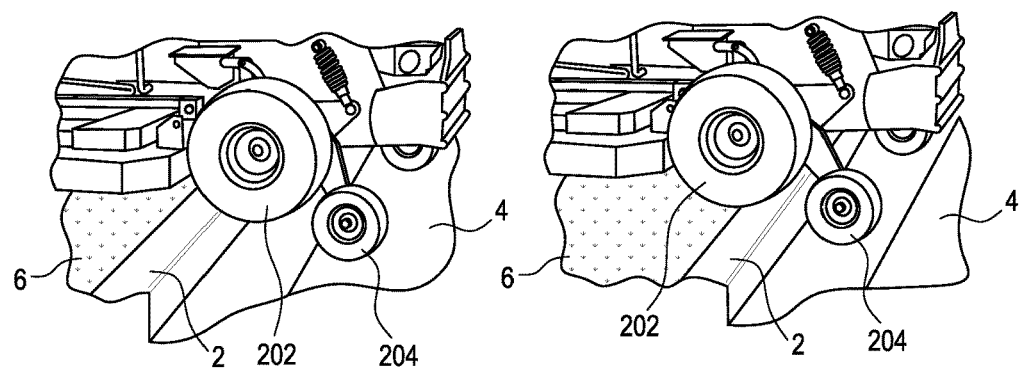
Figures 7D, 7E:
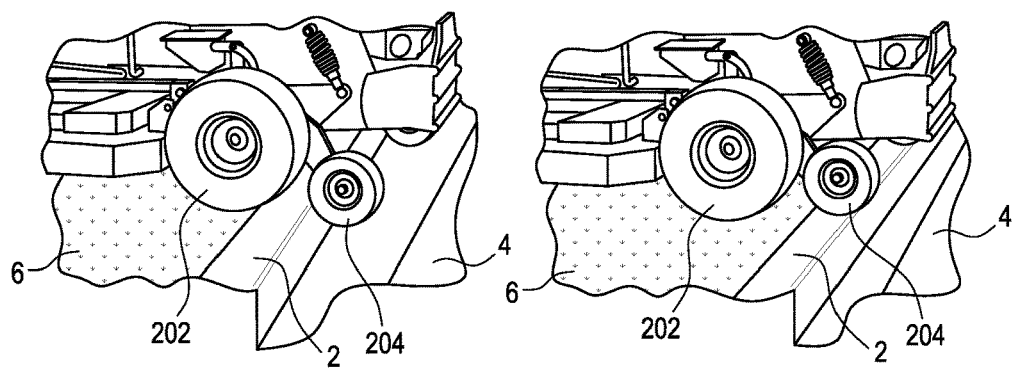

In use, it is very common for lawn mowers and other ridden (and walk-behind) implements to travel over uneven surfaces such as fields and concrete curbs. FIGS. 7a-7e illustrate the lawn mower 100 travelling over one uneven surface (i.e., a curb 2), with the primary wheels 202 being powered at all times by the components discussed above. As shown in FIG. 7a, both wheels 202, 204 are initially on a lower ground surface 4. Then, as the lawn mower 100 moves forward, the primary wheel 202 rises onto and over the curb 2 to an upper ground surface 6 while the secondary wheel 204 remains on the lower ground surface 4 (FIGS. 7b and 7c). The secondary wheel 204 subsequently rises onto and over the curb 2 such that both wheels 202, 204 are on the upper ground surface 6 (FIGS. 7d and 7e). To accomplish this, the rotating bracket 240 rotates automatically about the pivot axis 225 due to gravity and the forces transferred through the wheels 202, 204—without requiring a mechanical bias such as a spring. And by consistently having two points of contact (one by the primary wheel 202 and another through the secondary wheel 204), the wheel assembly 200 may distribute forces more evenly than in the prior art lawn mower 10 having rear wheels 16 instead of the wheel assemblies 200. This enhanced distribution of forces may provide a more comfortable, cushioned operator experience and cause less wear on the lawn mower 100. Further, it may cause less wear on the curb 2 since the curb 2 does not have to support as much concentrated force as would be present without the wheel assemblies 200. While the wheels 202, 204 may be various sizes as described above, it may be particularly desirable for each wheel 202, 204 to have a radius that is at least as great as the height of the curb 2; this configuration may minimize the effects of impact between the wheels 202, 204 and the curb 2, allowing the rotating bracket 240 to rotate efficiently.

Figure 8A:
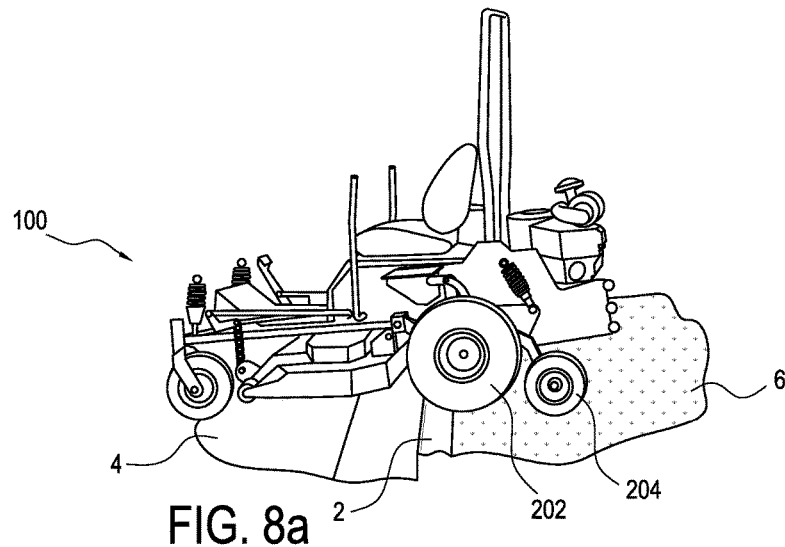
FIGS. 8a-8e illustrate the lawn mower of FIG. 2, while travelling down a curb.
Figure 8B:
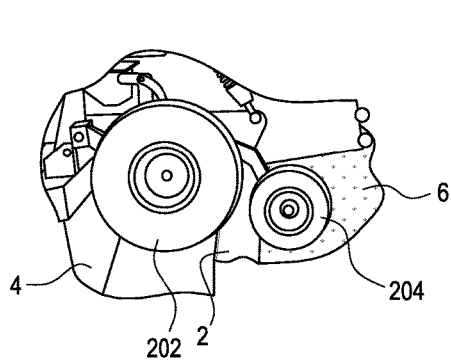
Figure 8C:
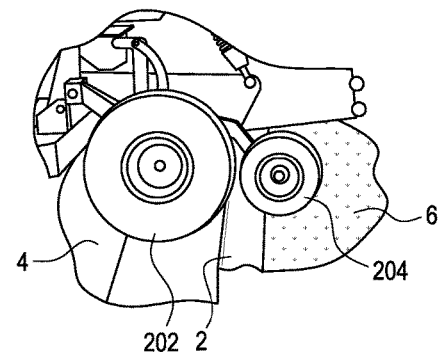
Figure 8D:
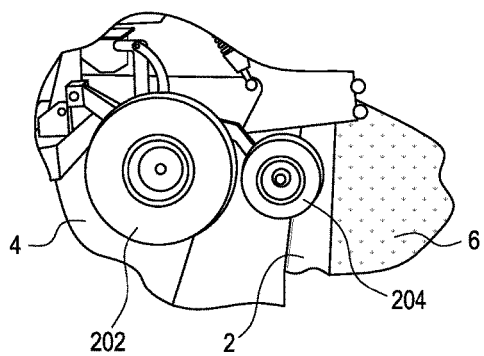
Figure 8E:
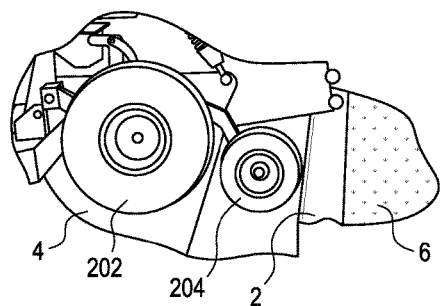

FIGS. 8a-8e show the lawn mower 100 travelling down one uneven surface (i.e., the curb 2) to further illustrate the movement of the rotating bracket 240 and the wheels 202, 204. As shown in FIG. 8a, both wheels 202, 204 are initially on the upper ground surface 6. Then, as the lawn mower 100 moves forward, the primary wheel 202 lowers down the curb 2 to the lower ground surface 4 while the secondary wheel 204 remains on the upper ground surface 6 (FIGS. 8b and 8c). The secondary wheel 204 subsequently lowers down the curb 2 such that both wheels 202, 204 are on the lower ground surface 4 (FIGS. 8d and 8e). As with going up over the curb (FIGS. 7a-7e), travelling down the curb 2 causes the rotating bracket 240 to rotate automatically about the pivot axis 225 due to gravity and the forces transferred through the wheels 202, 204—without requiring a mechanical bias such as a spring. And, again, the wheel assembly 200 may distribute forces more evenly than in the prior art due to the two constant points of contact, providing a more comfortable, cushioned operator experience and less wear on both the lawn mower 100 and the curb 2.

Figure 9:
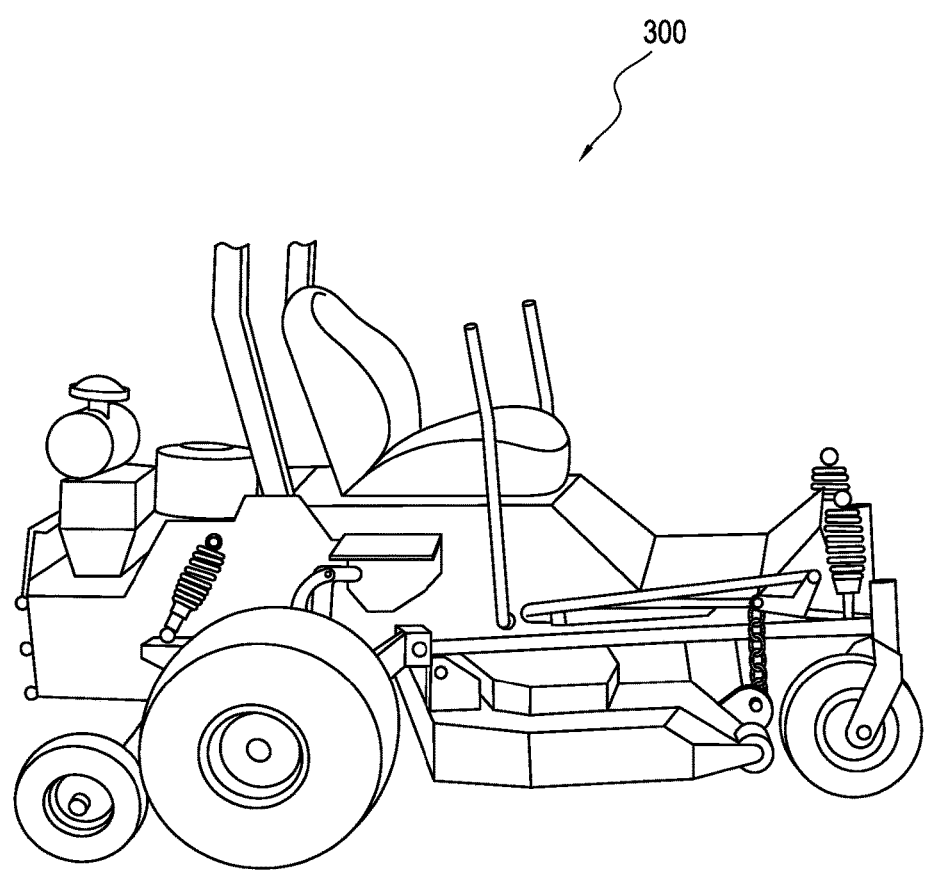
FIG. 9 is a side view of a lawn mower, according to another embodiment of the current invention.
Figure 10:
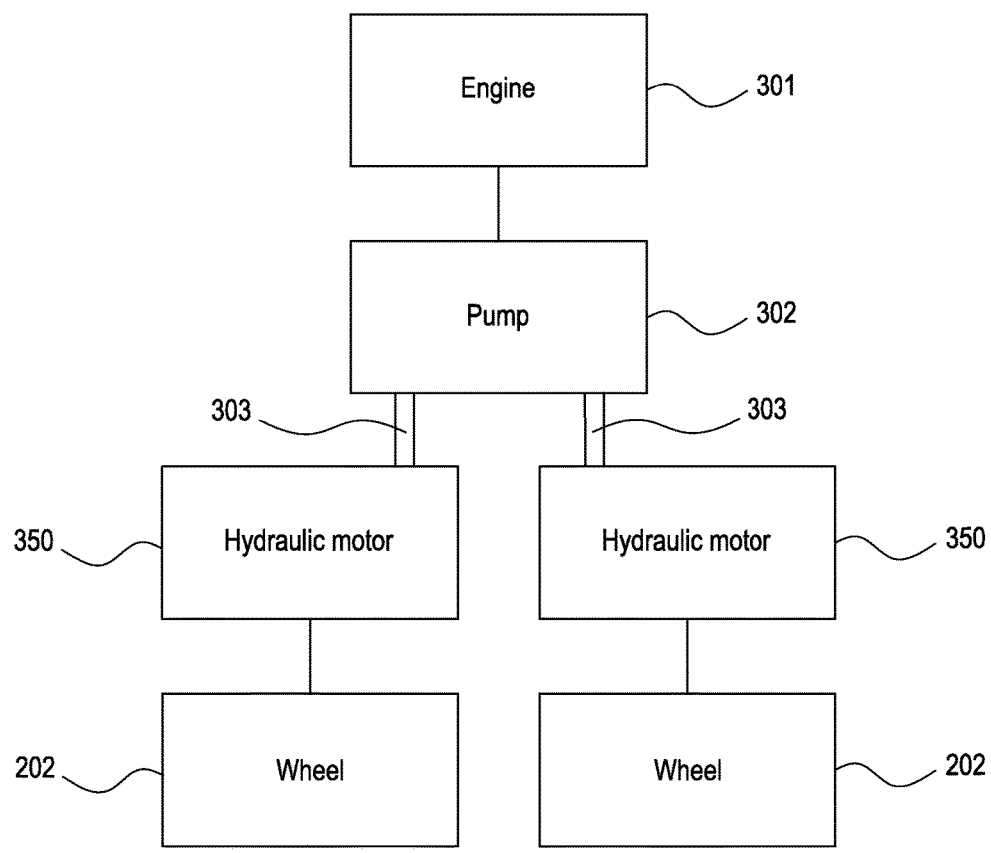
FIG. 10 is a block diagram illustrating portions of the lawn mower of FIG. 9.

FIGS. 9-10 show another lawn mower 300 according to an embodiment of the current invention. The lawn mower 300 is substantially similar to the lawn mower 100 described above, except as specifically noted and/or shown, or as would be inherent. For uniformity and brevity, corresponding reference numbers may be used to indicate corresponding parts, though with any noted deviations.

The lawn mower 300 primarily differs from the lawn mower 100 by powering the wheels 202 through hydraulic motors 350 instead of using the drive shafts 150. As the lawn mower 300 does not have the drive shafts 150, each inner plate 210 need not include the hole 212 through which the drive shaft 150 passes in the lawn mower 100. Moreover, the power transmitting members 252, 253, 254, 255, 256, 257, 258, 259 are unnecessary in the lawn mower 300 since a respective hydraulic motor 350 powers each primary wheel 202. More particularly, as shown in FIG. 10, an engine 301 powers a pump 302 which provides pressurized fluid to each hydraulic motor 350 through supply lines 303. The hydraulic motors 350 create rotational output from the pressurized fluid to turn the primary wheels 202.

Figure 11:
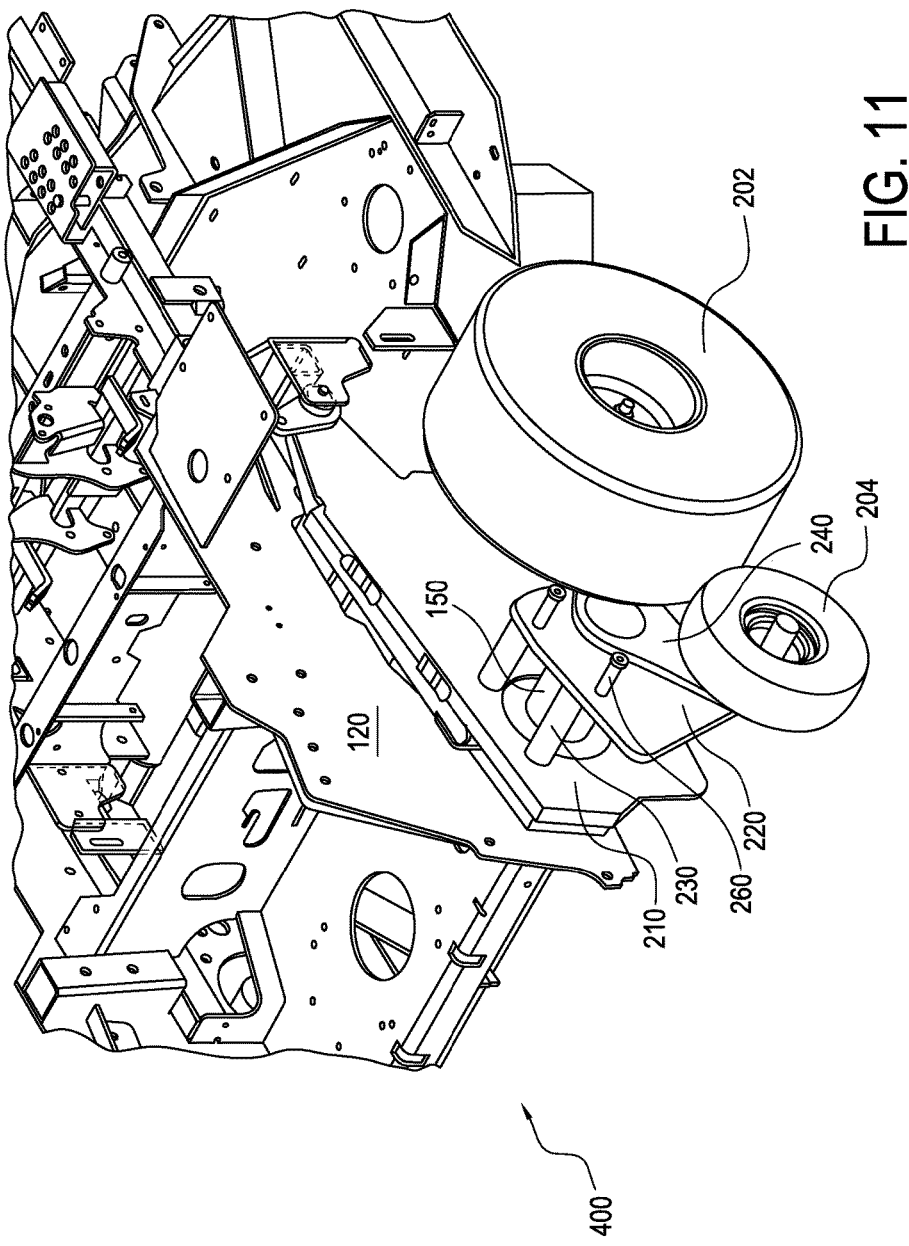
FIG. 11 is a perspective view of a wheel assembly from a lawn mower according to yet another embodiment of the current invention, shown with part of the lawn mower frame.
Figure 12:
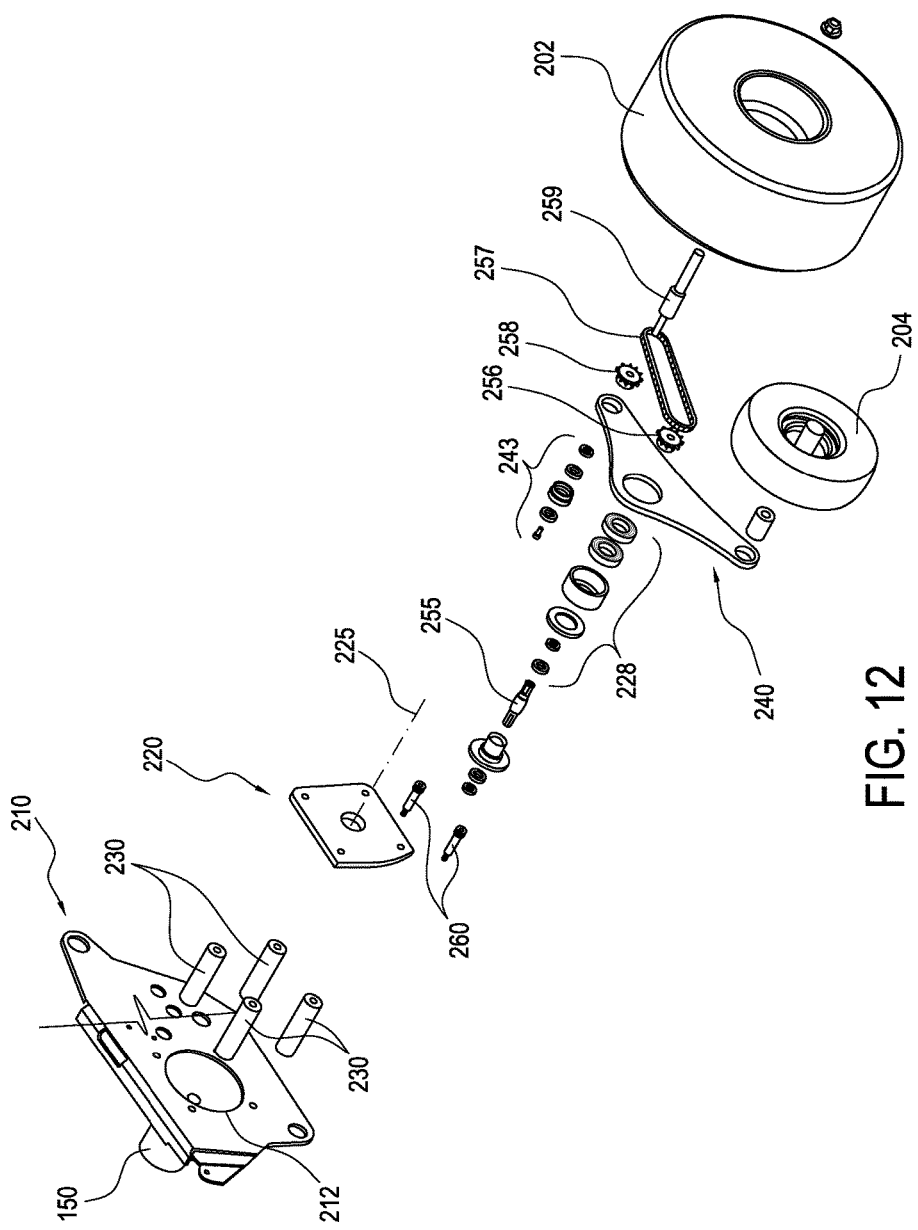
FIG. 12 is an exploded view of the wheel assembly of FIG. 11.

FIGS. 11 and 12 show yet another lawn mower 400 according to an embodiment of the current invention. The lawn mower 400 is substantially similar to the lawn mower 100 described above, except as specifically noted and/or shown, or as would be inherent. For uniformity and brevity, corresponding reference numbers may be used to indicate corresponding parts, though with any noted deviations.

The lawn mower 400 primarily differs from the lawn mower 100 by repositioning the drive shaft 150 further rearward, and by doing so eliminating the need for sprockets or pulleys 252, 254 and chain or belt 253. In the embodiment 400, power is transmitted from the drive shaft 150 to the sprocket or pulley 256, either directly or through the shaft 255. Moreover, the outer plate 220 may be smaller since the pivot axis 225 is aligned with the drive shaft 150 instead of being rearwardly offset.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. The specific configurations and contours set forth in the accompanying drawings are illustrative and not limiting.

The invention claimed is:

1. A lawn mower, comprising:
a frame;
a mower deck positioned at least partially below the frame; and
a pair of wheel assemblies positioned on respective lateral sides of the frame, wherein each wheel assembly comprises:
a rotating bracket comprising a first end portion, a second end portion, and a pivot portion positioned between the first end portion and the second end portion, wherein the rotating bracket is configured to pivot about a pivot axis, and further wherein the pivot axis is fixed relative to the frame;
a primary wheel supported by the first end portion of the rotating bracket, wherein the primary wheel is a drive wheel; and
a secondary wheel supported by the second end portion of the rotating bracket, wherein the secondary wheel is a non-drive wheel.

2. The lawn mower of claim 1, further comprising a drive shaft.

3. The lawn mower of claim 2, further comprising:
a first sprocket or pulley rotated by the drive shaft;
a second sprocket or pulley;
a first chain or belt transmitting force between: (a) the first sprocket or pulley and (b) the second sprocket or pulley;
a third sprocket or pulley in communication with the second sprocket or pulley, the third sprocket or pulley being axially aligned with the second sprocket or pulley;
a fourth sprocket or pulley in communication with the primary wheel, the fourth sprocket or pulley being axially aligned with the primary wheel; and
a second chain or belt transmitting force between: (a) the third sprocket or pulley and (b) the fourth sprocket or pulley.

4. The lawn mower of claim 3, wherein the pivot axis is axially aligned with: (a) the second sprocket or pulley and (b) the third sprocket or pulley.

5. The lawn mower of claim 4, wherein the first sprocket or pulley is between (a) the frame and (b) an outer plate fixed relative to the frame.

6. The lawn mower of claim 2, wherein the pivot axis is rearwardly offset from the drive shaft.

7. The lawn mower of claim 2, wherein the pivot axis is axially aligned with the drive shaft.

8. The lawn mower of claim 1, wherein the primary wheel is larger than the secondary wheel.

9. The lawn mower of claim 1, wherein an axis of the primary wheel and an axis of the secondary wheel are each offset generally equidistantly from the pivot axis.

10. The lawn mower of claim 1, further comprising a stop for limiting rotation of the rotating bracket about the pivot axis.

11. The lawn mower of claim 1, further comprising a hydraulic motor powering the primary wheel.

12. Outdoor equipment, comprising:
a frame;
a pair of wheel assemblies configured to be positioned on respective lateral sides of the frame, wherein each wheel assembly comprises:
a rotating bracket rotatable relative to the frame about a pivot axis, wherein the pivot axis is fixed relative to the frame and extends through at least a portion of the frame;
a primary wheel supported by the rotating bracket, the primary wheel being axially offset from the pivot axis, and the primary wheel being a drive wheel; and
a secondary wheel supported by the rotating bracket, the secondary wheel being axially offset from the primary wheel and from the pivot axis, and the secondary wheel being a non-drive wheel.

13. The outdoor equipment of claim 12, further comprising a drive shaft, the pivot axis being one of rearwardly offset from the drive shaft and axially aligned with the drive shaft.

14. The outdoor equipment of claim 12, wherein the primary wheel is larger than the secondary wheel.

15. The outdoor equipment of claim 12, wherein rotation of the rotating bracket is mechanically unbiased relative to the frame.

16. The outdoor equipment of claim 12, further comprising an outer plate fixed relative to the frame, the rotating bracket being pivotally connected to the outer plate.

17. A wheel assembly for outdoor equipment, comprising:
a rotating bracket comprising a first end portion, a second end portion, and a pivot portion positioned between the first end portion and the second end portion, wherein the pivot portion of the rotating bracket is rotatable about a pivot axis;
a primary wheel supported by the first end portion of the rotating bracket about a first axis of rotation, the first axis of rotation being both axially and vertically offset from the pivot axis; and
a secondary wheel supported by the second end portion of the rotating bracket about a second axis of rotation, the second axis of rotation being both axially and vertically offset from the pivot axis wherein the primary wheel is configured as a drive wheel, and the secondary wheel is configured as a non-drive wheel.

18. The wheel assembly of claim 17, further comprising:
an outer plate;
an inner plate; and
a spacer separating the outer plate and the inner plate, wherein the outer plate has a leading end and a trailing end, the trailing end extending rearwardly beyond the inner plate, the inner plate extending forwardly beyond the leading end.

19. The wheel assembly of claim 17, further comprising:
an inner plate having a drive shaft hole for passing a drive shaft therethrough;

wherein the pivot axis is one of rearwardly offset from the drive shaft hole and axially aligned with the drive shaft hole.

* * * * *